Patented May 14, 1946

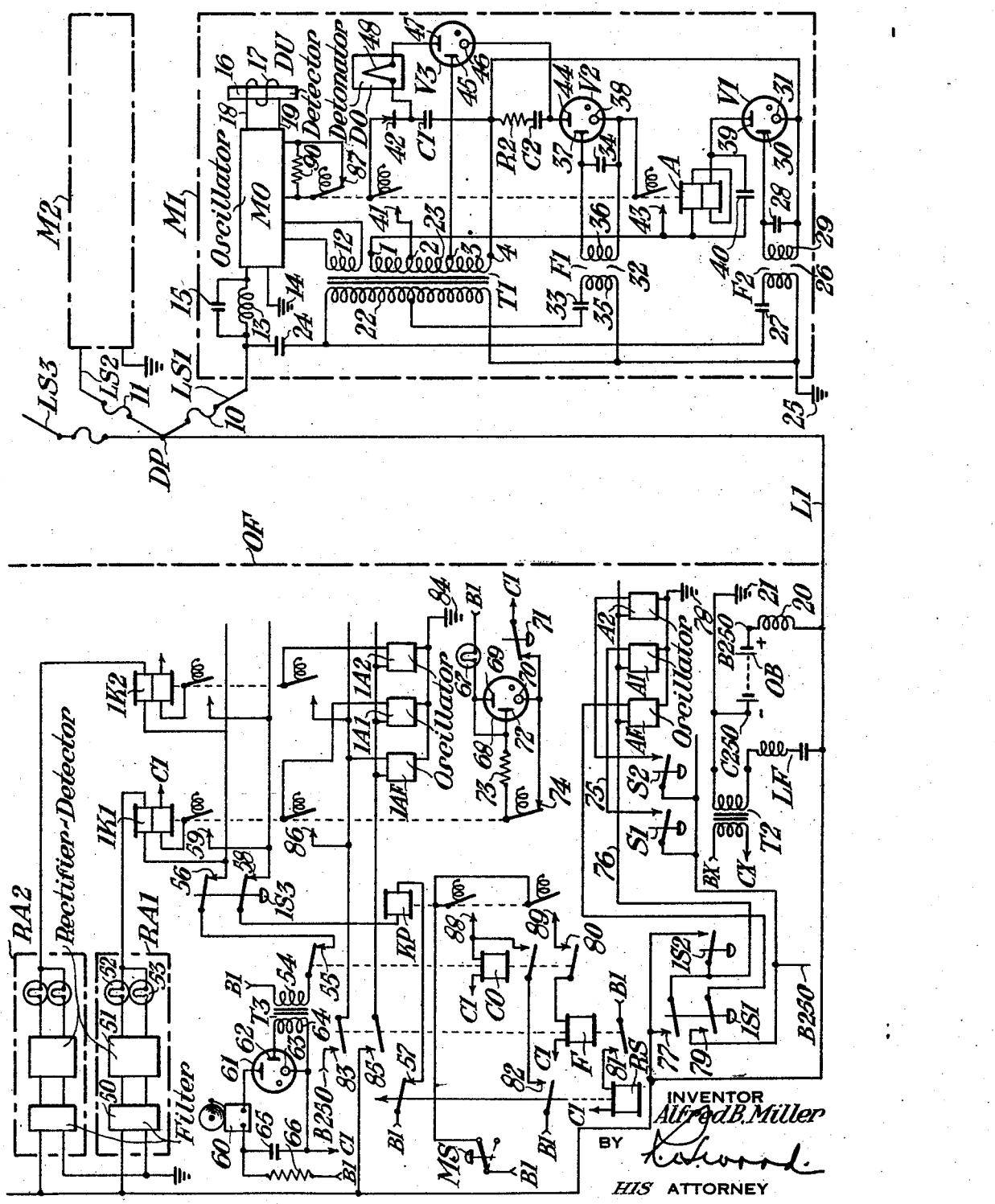

2,400,260

UNITED STATES PATENT OFFICE 2,400,260

SELECTIVE CONTROL AND INDICATION SYSTEM

Alfred B. Miller, Edgewood, Pa., assignor to The Union Switch & Signal Company, Swissvale, Pa., a corporation of Pennsylvania Application July 17, 1943, Serial No. 495,231

7 Claims. (Cl. 177—353)

My invention relates to selective control and indication systems, and more particularly to apparatus for individually controlling and indicating a plurality of electric equipments.

It is frequently required to selectively control a plurality of devices having similar electric equipments from a remote control point, and to selectively indicate the conditions of such devices at the control point. When such devices are not easily accessible it is desirable that the equipments of the different devices may be tested from time to time by an operator at the control point to determine the operative condition of each equipment. Also, it is in the interest of simplicity and economy that these services be accomplished through a single line circuit. Furthermore, in such a system, accuracy of selection, reliability of operation and non-interference due to foreign energy are important.

Accordingly, a feature of my invention is the provision of apparatus for a selective control and indication system incorporating novel and improved means to selectively indicate at which one of a plurality of devices a given event occurs and to control that device either automatically in response to such indication or to control the device manually as an operator may see fit, in response to such an indication.

Another feature of my invention is the provision of apparatus of the type here involved incorporating novel means wherewith the probability of operation by energy from any source other than the proper source is minimized.

Still another feature of my invention is the provision of apparatus for a system of the type here contemplated incorporating novel means for resetting and at times avoiding an operation of the apparatus.

A peculiar feature of my invention is the provision of novel and improved indication and control means for a mine field and wherewith a mine is fired either automatically in response to the approach of a vessel to the mine or may be fired manually as an operator may see fit in response to an indication of the approach of a vessel to the mine.

Other features, objects and advantages of my invention will appear as the specification progresses.

The above features, objects and advantages of my invention will appear as the specification progresses.

The above features, objects and advantages of my invention are attained by using currents of different characteristics for indication, control and operation of each device of a group of similar devices. Each device is provided with an electric equipment characterized to be individual to the respective device, and the several equipments are connected in multiple to a single transmitting or line circuit extending from the location of the devices to a remote control office. A source of direct current of suitable voltage and a source of alternating current which may be of the usual 60 cycle commercial frequency are connected to the line circuit at the office to constantly supply power to the different equipments. Each equipment is provided with an indication oscillator which is connected to the line circuit to be powered by the direct current and the 60 cycle current and each such oscillator supplies to the line circuit an indication alternating current of a frequency preselected for the individual device. Each such indication oscillator has associated therewith a control or detector unit which is influenced in response to a predetermined condition at the device to modulate the indication current with two distinctive characteristics, such characteristics being preferably an increase in the amplitude of the current followed by a decrease in the amplitude, or vice versa. Thus the line circuit is normally supplied with power and is excited with different indication currents, one for each device of the group, and any one or more of which indication currents may carry distinctive characteristics.

The office is provided with indication apparatus or indication receivers, one for each device, and the several receivers are connected in multiple to the line circuit through individual filters. Each such filter is tuned to pass only current of the frequency of the indication oscillator of the respective device. Each indication receiver is characterized by being responsive in one sense in response to the first modulation characteristic of the indication current, and is responsive in a second sense in response to the second modulation characteristic of the current. Each indication receiver when thus responsive governs indicators which may be visual or audible, or both. Thus there is provided at the office an indication when a predetermined event occurs at any one of the associated devices, and the indication designates the particular device at which the event has occurred.

Each device is controlled and operated by the use of a control alternating current and an operating alternating current supplied through the line circuit to the equipment simultaneously. To this end the office is provided with control oscillators, one for each device and an operating oscillator for the group. Each control oscillator supplies current of a frequency individual for the respective device and the operating oscillator supplies current of a frequency different from all the other currents used. Thus, this operating current in cooperation with any one of the control currents can be used to govern the device associated with the particular control oscillator. For manual control, I provide at the office a control switch for each of the individual control oscillators, and another switch for the operating oscillator, and through which switches the oscillators are connected to the line circuit and are made active or inactive. Thus the closing of any control switch and said other switch serves to supply to the line circuit an individual control current and the operating current simultaneously.

For automatic control, the office apparatus is provided with indication relays, one for each device, and a group of interconnected relays. Each indication relay is governed by the indication receiver of the respective device, and in turn governs the operation of the group of relays. An indication relay and the group of relays when operated connect the control oscillator of the same device as the indication relay and the operating oscillator to the line circuit simultaneously.

To assure accurate selection, reliable operation and non-interference due to foreign energy, the equipment of each device includes control and operating means comprising a transformer, two filters, a relay, three ionization type of electron tubes, two condensers which serve as a secondary source of energy and an operating unit. The transformer and filters are connected in multiple to the line circuit through a blocking condenser to avoid energization thereof due to the direct current supplied to the line circuit. The transformer is designed for effective transfer of 60 cycle alternating current, that is, the power current. One filter is tuned to pass current only of the frequency of the control oscillator of the respective device, and the other filter is tuned to pass current only of the frequency of the operating oscillator. Energy passed by the first mentioned filter serves to break down a first one of the electron tubes and energize the relay by current supplied from the transformer. Energy passed by the second mentioned filter serves to excite a second one of the electron tubes if the relay is energized. Such operation of the tubes and relay connects the condensers to the transformer to be charged by the power current and when charged these condensers in series serve to excite a third one of the electron tubes to break down that tube. The third tube on breaking down connects the condensers to the operating unit, and the operating unit is actuated due to the discharged energy from the condensers. It follows that for actuating the operating unit of a device, the control and operating currents, as well as the 60 cycle power current, must be present on the line circuit.

I further provide at the office cancelling switches by which an indication of a device may be cancelled or reset without an operation of the device being effected. Also test switches are located at the office through which an operator can test the equipment of a device without an actual operation of the operating unit of the device. Furthermore, the office includes means wherewith indication and operation of a device cannot be initiated due to an operation of some one of the other devices.

I shall describe one form of apparatus embodying my invention and shall then point out the novel features thereof in claims.

The accompanying drawing is a diagrammatic view showing one form of apparatus embodying my invention when used to indicate, control and fire the mines of a submarine mine field. It is to be understood that the invention is not limited to mine fields, and this one use serves to illustrate the principle of the invention. Furthermore, it is to be noted that that portion of the apparatus used for indication may be used independent of that portion of the apparatus used for control and operation, and vice versa.

Referring to the drawing, the dash-dot rectangles M1 and M2 represent two mines of a mine field protecting a harbor, only two mines M1 and M2 of the field being shown for the sake of simplicity since the mines are all alike and two are sufficient for a full understanding of the invention. The reference character OF designates a control office on shore in the vicinity of the harbor that is defended by the mine field. The office OF and the mines are connected by a transmitting or line circuit comprising a single conductor cable L1 and the ground path. Conductor L1 extends from the office to a distribution point DP conveniently located with respect to the mine field, and from which point a single conductor cable similar to cable L1 extends to each mine, the cables to mines M1 and M2 being identified as cables LS1 and LS2, respectively, while a third broken cable LS3 extends to a third mine, not shown. Fuses 10 and 11 are interposed in cables LS1 and LS2, respectively, at the distribution point for reasons to appear hereinafter. As stated above, one side of this line circuit is completed through the ground path, but a metallic conductor can be used.

Each mine is provided with an electric equipment through which the approach of a vessel is indicated and the mine is fired and tested. The mine equipments are alike except for the tuning of the circuits, and a description of the equipment for one mine will serve for an understanding of all. For this reason, the drawing discloses the equipment of mine M1, and mine M2 is shown conveniently in order to not unduly complicate the drawing.

The equipment of mine M1 comprises as essential elements an indication oscillator having a control or detector unit associated therewith, a power transformer, control and operating means, an operating unit and testing means. The indication oscillator shown conventionally at M0 may be of any one of several types, but preferably is of the electron tube type. The specific structure of such oscillator forms no essential element of my invention, and it is sufficient for this application to point out that the filament circuits for the tubes of the oscillator are heated by current from a secondary winding 12 of a power transformer T1 receiving power from the line circuit in a manner to appear shortly, and the plate circuits of the tubes of the oscillator are energized by direct current received from the line circuit through a connection including inductance 13 and ground electrode 14, the direct current being supplied to the line circuit in a manner to be explained later. When thus powered, the oscillator MC0 supplies to the line circuit through a connection including a condenser 15 and ground electrode 14, an alternating current of a frequency preselected for mine M1. For example, this indication current for mine MI may be of a frequency of 10,000 cycles per second and would be of a substantially constant amplitude as long as the oscillator is powered in the manner just explained.

A control or detector unit DU associated with oscillator MO may take different forms and may be of the magnetic type, and the construction of such unit is disclosed only to the extent required for a full understanding of my invention since its construction forms no part of my invention. A magnetizable core 16 is provided with a winding 17 connected to oscillator MO through wires 18 and 19. When a magnetizable body, such as, for example, a vessel with a steel hull approaches the unit DU, it is magnetically influenced to control the output of the oscillator, the amplitude of the output of the oscillator being made to first increase and then decrease, or vice versa, at a rate predetermined in part by the proportioning of the parts of the apparatus. That is to say, the unit DU may control the coupling or bias of the tubes of the oscillator to vary the amplitude of the output of the oscillator in response to a magnetic influence. Hence, under normal conditions, that is, when no vessel is present, oscillator MO supplies to the line circuit an indication current of a frequency individual for mine MI, and of a normal amplitude, but when a vessel is present, the amplitude of the indication current increases and then decreases, or vice versa, and such variation in amplitude takes place at not less than a preselected rate. In other words, the indication current is at times modulated to have two distinctive characteristics which follow each other within a predetermined interval.

Transformer TI is a power transformer having a primary winding 22 connected across the line circuit through a blocking condenser 24, and ground electrode 25, to receive power from a source of alternating current connected to the line circuit at the office, as will later be pointed out. Transformer TI is provided with a secondary winding 23 as well as secondary winding 12 referred to hereinbefore, winding 23 being provided with different terminals designated by the numerals 1, 2, 3 and 4 to furnish power at different voltages to the control and operating portion of the equipment.

The control and operating means of the mine equipment comprises filters FI and F2, a relay A, electron tubes VI, V2 and V3 and condensers CI and C2. Filter F2 includes a transformer 26 and condensers 27 and 28, the primary winding of transformer 26 in series with condenser 27 being connected across the line circuit through blocking condenser 24 and ground electrode 25, and secondary winding 29 of transformer 26 and condenser 28 in multiple being connected to a control electrode 30 and cathode 31 of tube VI. Filter F2 is tuned to pass current only of the frequency preselected for the control current of mine MI, and by way of illustration I shall assume that this control current for mine MI is of the frequency of 5000 cycles per second.

Filter FI includes a transformer 32 and condensers 33 and 34, primary winding 35 of transformer 32 in series with condenser 33 being connected across the line circuit through a portion of primary winding 22 of transformer TI and blocking condenser 24, and secondary winding 36 of transformer 32 and condenser 34 in multiple being connected to control electrode 37 and cathode 38 of tube V2. Filter FI is tuned to pass current only of the frequency preselected for the operating current, and by way of illustration I shall assume the frequency of the operating current to be 1000 cycles per second.

Tube VI is a cold cathode gas filled tube, the anode 39 and cathode 31 of which are connected through a winding of relay A to terminals 1 and 4 of secondary winding 23 of transformer TI, as will be clear by an inspection of the drawing, the voltage thus applied to the anode of tube VI being however, insufficient to break down the tube. When, however, control current is passed by filter F2 to excite tube VI, the tube breaks down and current flows through the anode circuit to energize relay A, relay A being energized by the positive half cycle passed through tube VI and retained energized during the negative half cycle of the power current supplied from transformer TI due to a condenser 40 connected across the winding of relay A.

Relay A is a bias polar relay and is operated to its reverse position, that is, the position opposite that shown in the drawing when energized by the current passed through tube VI. With relay A operated to close its reverse contact 41, condenser CI is connected across terminals 2 and 4 of secondary winding 23 of transformer TI through a rectifier 42 and condenser CI is charged due to the 60 cycle power current from the line circuit, the voltage of the charge built up on condenser CI being preselected according to the position of terminal 2 of secondary winding 23. The energy thus stored in condenser CI serves as a secondary source of power for operating the operating unit as will appear shortly.

Tube V2 is also a cold cathode gas filled tube and is provided with an anode circuit connected across terminals 4 and 1 of secondary winding 23 of transformer TI, such circuit extending from terminal 4 through a resistor R2, condenser C2, anode 44 and tube space to cathode 38 of tube V2, and contact 43 of relay A to terminal 1 of secondary winding 23. Hence, when relay A is energized to close contact 43 and operating current is passed from the line circuit through filter FI to excite the control electrode 37 of tube V2, tube V2 breaks down and condenser C2 is charged by the half cycles of the power current that makes terminal 4 of transformer TI positive, the voltage of condenser C2 being preselected according to the proportioning of secondary winding 23 and resistor R2. The charge thus built up on condenser C2 serves as an additional source of secondary energy to be used for operating the operating element of the equipment.

Tube V3 is likewise a cold cathode gas filled tube having a control electrode 45 connected to terminal 3 of secondary winding 23 and its cathode 46 connected to terminal 1 through a path including tube V2 and contact 43 of relay A. Hence when the relay A is energized and tube V2 is made conductive, the tube V3 is excited from terminals 1 and 3 of secondary winding 23. With condensers CI and C2 charged in the manner just described, the voltage across the condensers CI and C2 in series is applied across the anode 47 and cathode 46 of tube V3 to break down that tube due to the excitation of the control electrode 45, and with tube V3 made conductive, the charge on condensers CI and C2 causes current to flow through an element 48 of the operating unit DO which is a detonator for the mine. This discharge current through the element 48 of the detonator of the mine is sufficient to cause the firing of the mine.

The equipment for mine M2 and for each of the other mines of the mine field is substantially the same as that just described for mine M1, except for the tuning of the indication oscillator and the tuning of the filter for the control current.

The office apparatus comprises a source of power, indication means, manual control means, automatic control means and reset and testing means.

The source of power at the office includes a source of direct current and a source of 60 cycle alternating current, these two sources of current being permanently connected to the line circuit, and as disclosed the direct current source is a battery OB of proper voltage, its positive terminal B250 being connected to conductor L1 through a choke coil 20 and its negative terminal C250 being connected to a ground electrode 21. The source of power alternating current is a transformer T2, the primary winding of which is connected to terminals BX and CX of a suitable source, such as a generator, not shown, and the secondary winding of which has one terminal connected to line conductor L1 through a line filter LF and its other terminal connected to ground electrode 21.

The indication means may take different forms and preferably includes an individual receiver for each mine, the indication receivers RA1 and RA2 for mines M1 and M2, respectively, being shown in the drawing. Preferably, each indication receiver is of the construction disclosed and claimed in a copending application Serial No. 494,183, filed July 10, 1943, by W. P. Place, for Electrical control and indication apparatus, and to which application reference is made for a full understanding of such indication apparatus, and it is sufficient for this application to describe such indication receiver or apparatus but briefly. Indication receiver RA1 for mine M1 is connected to the line circuit through a filter 50 of any well-known arrangement, the parts of such filter being proportioned to pass alternating current only of the frequency of the indication current supplied by the indication oscillator MO of mine M1, and which current I have assumed for illustration to be of 10,000 cycles per second. The energy passed by filter 50 of receiver RA1 is applied to a rectifier-detector 51, which includes two gas filled tubes biased in such a manner that an increase in the amplitude of the received indication current causes one tube to break down and illuminate a first indication lamp 52, and a decrease in the amplitude of the indication current causes the other gas filled tube to break down and illuminate a second indication lamp 53. According to my invention, a winding of an indication relay IK1 is interposed in the common portion of the circuits of lamps 52 and 53, the circuit being traced from terminal B1 of a suitable source of direct current such as a battery not shown, through winding 54 of a transformer T3, back contact 55 of a relay CO to be referred to later, normally closed contact 56 of a manually operable cancelling switch 1S3, top winding of relay IK1, lamps 52 and 53 and the respective gas filled tubes in multiple to the other terminal of the same source of current. Relay IK1 is a bias polar relay and is adjusted so that when it is energized by the current flowing when both lamps 52 and 53 are illuminated, the relay is operated against its bias to the left-hand position as viewed in the drawing, but when current for one lamp only flows, the relay is not energized sufficiently to operate its contacts. Indication relay IK1 is provided with a stick circuit which extends from terminal B1, through back contact 57 of a relay RS and the winding of a repeater relay KP of a group of relays to be described shortly, normally closed contact 58 of the cancelling switch 1S3, reverse contact 59 of relay IK1, and lower winding of relay IK1 to terminal C1 of the same source of current. It follows that operation of relay IK1 in response to the illumination of lamps 52 and 53, due to variations in the indication current received from the line circuit, causes relay IK1 to be retained in its operated position through its stick circuit until such time as the stick circuit is opened either at back contact 57 of relay RS or contact 58 of switch 1S3.

An indication relay IK2 is associated with the indication receiver RA2 for mine M2 in the same manner as relay IK1 is associated with the receiver RA1.

The indication means also includes an audible indicator in the form of a bell or gong 60, and which is controlled through transformer T3 and a gas filled tube 61. Control electrode 62 and cathode 63 of tube 61 are connected across secondary winding 64 of transformer T3, and bell 60 is connected in an anode circuit which is connected to the B1—C1 current source and to a condenser 65. Normally condenser 65 is charged from the battery B1—C1 through a resistor 66, the charge on the condenser being substantially the full voltage of the battery. When either lamp 52 or 53 is illuminated, the surge of current through the primary winding 54 of transformer T3 induces an electromotive force in secondary winding 64 to excite tube 61, and which tubes breaks down under the influence of this excitation and the voltage of condenser 65 and condenser 65 discharges through bell and the tube to cause the bell to sound, the voltage from source B1—C1 through resistor 66 being insufficient to retain the tube conductive.

The indication means also includes an auxiliary indication lamp for each mine, and which auxiliary lamp serves as a permanent record that a mine has been fired. Such a lamp 67 is provided for mine M1 and lamp 67 is controlled by indication relay IK1 and a cold cathode gas filled tube 68. The anode circuit for tube 68 includes terminal B1, lamp 67, anode 69 and tube space to cathode 70, a push button 71 and terminal C1. The control electrode 72 of the tube is connected to terminal B1 through lamp 67, and is connected to cathode 70 through a shunt path including resistor 73 and the normally closed contact 74 of relay IK1. When relay IK1 is operated to open contact 74 in response to an indication current from mine M1, tube 68 is excited and becomes conductive so that lamp 67 is illuminated. Subsequent to such operation of relay IK1 the tube 68 remains conductive so that the lamp 67 remains illuminated until such time as the push button 71 is operated to open the anode circuit.

The manual control means includes a control oscillator and an associated manually operable switch for each mine, together with an operating oscillator that is common to the entire group of mines. Oscillators A1 and A2 are the control oscillators for mines M1 and M2, respectively, and these oscillators are governed by switches S1 and S2, respectively. The operating oscillator is indicated conventionally at AF and is controlled by switch 1S1. The type of oscillator is immaterial and oscillators A1, A2 and AF, as well as all other oscillators, are preferably of the electron tube type. Closing of switch S1 to connect terminal B250 of the office source of direct current to oscillator A1 through wire 75 serves to energize that oscillator and it is made active to supply control current of a frequency individual for mine M1, and which frequency I assumed hereinbefore to be of 5000 cycles per second. The output side of oscillator A1 is connected across the line circuit by one of its output terminals being connected to conductor L1 through wire 76 and contact 77 of switch 1S1 and its other output terminal being connected to ground electrode 78. Similarly, operation of switch S2 renders control oscillator A2 for mine M2 active. Operation of switch 1S1 to close contact 79 connects terminal B250 to the operating oscillator AF and that oscillator is rendered active to supply current of the frequency selected for the operating current, and which frequency I have assumed hereinbefore to be of the order of 1000 cycles per second. Also the closing of switch 1S1 connects the output side of the oscillator AF to the line circuit in multiple with the output of oscillator A1. It is clear, therefore, that simultaneous operation of switches S1 and 1S1 causes control oscillator A1 and operating oscillator AF to become active and supply current to the line circuit.

The automatic control means includes a master switch MS, a group of interconnected relays KP, CO, F and RS; an operating oscillator 1AF and individual control oscillators 1A1, 1A2, etc., a control oscillator for each mine. Operating oscillator 1AF is of the same construction as oscillator AF of the manual control means, and likewise the control oscillators 1A1 and 1A2 are similar to the control oscillators A1 and A2, respectively. It is believed that this automatic control means, as well as the reset and testing means of the office apparatus may best be understood from a description of the operation of the apparatus, it being pointed out that the automatic control apparatus is made active when the master switch MS is set at the position illustrated by a solid line, and is made inactive when the switch MS is set at the position illustrated by a dotted line.

Normally, that is, when no vessel is approaching the mine field, the apparatus is positioned as shown in the drawing, and the indication oscillator at each mine is active to supply current of an individual frequency to the line circuit, each such indication current being of a normal amplitude, that is, it is non-modulated. I shall assume that the master switch MS is set at its full line position to actively condition the automatic control apparatus, and a vessel approaches mine M1 to influence its control unit DU for modulating the indication current of that mine, the amplitude of the current being increased and then decreased with respect to its normal value. Such modulation of the indication current is indicated at the office by the two lamps 52 and 53 being illuminated, and the indication relay 1K1 being operated, the gong or bell 60 being momentarily sounded, first when lamp 52 is illuminated and then again when lamp 53 is illuminated. Operation of relay 1K1 closes its stick circuit and also initiates an automatic firing action for the mine. Repeater relay KP is energized when the stick circuit for relay 1K1 is completed. Relay KP is a bias polar relay and when thus energized it is operated to its reverse position to close contacts 88 and 89. With contact 88 closed, current flows from terminal B1 through master switch MS closed, contact 88 and winding of relay CO to terminal C1, and relay CO is energized and picked up. With relay CO picked up opening back contact 55, the circuits through the top winding of relay 1K1 and lamps 52 and 53 and the respective associated gas filled tubes are opened and the tubes are deionized so that the lamps 52 and 53 are extinguished, relay 1K1 remaining in its reverse position due to its stick circuit. With relay CO picked up to close front contact 80 current flows from terminal B1 through switch MS, contact 89 of relay KP, front contact 80 of relay CO and winding of firing relay F to terminal B1, and relay F is energized. The picking up of relay F to close front contact 83 completes a circuit for supplying current from terminal B250 of battery OB to the operating oscillator 1AF, and that oscillator is made active, its operating circuit being completed through ground electrodes 84 and 21. Current also flows from terminal B250 through front contact 83, reverse contact 86 of indication relay 1K1, operating circuit of the control oscillator 1A1, and ground electrodes 84 and 21 to terminal C250, and the control oscillator 1A1 is rendered active. The output sides of both oscillators 1AF and 1A1 are connected across the line circuit through front contact 85 of the relay F and ground electrode 84. With both operating current and control current thus supplied to the line circuit simultaneously, current is passed by the two filters F1 and F2 of the equipment of mine M1, and the mine is fired due to the energizing of the detonator in the manner explained in detail hereinbefore. The picking up of relay F to close front contact 81 completes an obvious circuit for energizing relay RS and that relay is picked up at the end of a predetermined slow pick-up period. The picking up of relay RS closing front contact 82 completes a stick circuit easily traced for the relay CO. The opening of back contact 57 of relay RS removes current from the stick circuit of relay 1K1 with the result that both relays 1K1 and KP are deenergized and operated to their normal positions by the bias features of the relays. Opening of contact 89 of relay KP deenergizes the firing relay F and that relay is released to open front contacts 81, 83 and 85. The opening of front contacts 83 and 85 removes current from the oscillators and disconnects their output sides from the line circuit. The opening of front contact 81 causes relay RS to be deenergized, and relay RS is released to open front contact 82 in the stick circuit of relay CO, which latter relay is then released and the firing action is completed and the relay group is made in readiness to automatically fire any other mine that becomes indicated through its respective indication apparatus.

When mine M1 is fired, the mine end of cable LS1 is torn loose and becomes grounded causing an excessive current to flow from battery OB and the transformer T2 with the result the fuse 10 interposed in cable LS1 at the distribution point DP blows and frees the system from the cable of the fired mine.

It is to be noted that lamp 67 is illuminated when indication relay 1K1 is operated in response to the approach of the vessel to mine M1, and remains illuminated as an indication or permanent record of the firing of this mine as explained above. Lamp 67 can, of course, be extinguished by the operator using push button 71 to open the anode circuit for tube 68.

When mine M1 is fired the control unit DU for mine M2 may be influenced in such a way as to cause the indication current for mine M2 to be modulated as if a vessel was approaching the mine. This modulation of the indication current would be received by the indication receiver RA2 and would tend to bring about the energization of indication relay IK2. However, the automatic firing action started due to operation of indication relay IK1 for mine M1 causes relay CO to be picked up to open back contact 55, removing current from the control circuit for relay IK2, and all other indication relays. Thus, since relay CO is retained energized during the entire automatic firing action for mine M1, and which action may be made relatively long due to the slow pick-up period of relay RS, the indication oscillator at mine M2 would stabilize at its normal condition and remove excitation from the respective indication receivers before the firing action for the mine first indicated is terminated, and firing of a mine due to the firing of an adjacent mine is avoided.

I shall next assume that the apparatus is at a normal condition with master switch MS in the position illustrated by the dotted line, so that the automatic control means is made inactive, and manual firing of a mine is relied upon. A vessel approaching mine M1 brings about modulation of the indication current and the actuation of the indication lamps 52 and 53 at the office together with operation of relays IK1 and KP in the manner already explained. Operation of relays IK1 and KP serves no useful purpose at this time except to bring about the illumination of lamp 67, which would serve as a record that mine M1 has been indicated. With lamps 52 and 53 illuminated to indicate the presence of a vessel near mine M1, the operator can fire mine M1 by simultaneously closing switches S1 and IS1 to render oscillators A1 and AF active and connect their output sides to the line circuit. This would result in control current and operating current being passed by filters F1 and F2 at the mine simultaneously and the mine being fired.

It is to be observed that the operator can bring about the firing of a mine at any time irrespective of the indication apparatus by closing the proper control oscillator switch and switch IS1.

Under manual control and indication for mine M1 would be cancelled by the operator actuating switch IS3 to open the circuit for deionizing the tubes of the indication receiver and to open the stick circuit for the indication relay.

In the event mine M2 or any other mine of the field should become indicated due to manual firing of mine M1, such indication of mine M2 can be cancelled by the operation of switch IS3, as explained hereinbefore.

Provision has been made for periodically testing the individual mine equipments to see that they are in proper working condition. To test mine M1, for example, the switch S1 would be closed to render the control oscillator A1 active as already explained. A switch IS2 would then be closed to connect the output of the oscillator A1 to the line circuit. This control current thus supplied to the line circuit would be passed by filter F2 to excite tube V1 and energize relay A of the mine equipment. Switch IS2 would then be released to remove the control current from the line circuit causing tube V1 to be deionized and relay A restored to its normal position by the bias feature of the relay. Such momentary operation of relay A to open its contact 87 opens a shunt around resistor 90 of the indication oscillator MO, and oscillator MO is controlled in such a manner that the double modulation of the output of the oscillator is effected. That is, the amplitude of the oscillator MO is made to increase and then decrease similar to the variations effected through unit DU. This double variation of the amplitude of the indication current controls the indication receiver RA1 thereby completing the indication. The indication effected through this test would be cancelled by operation of switch IS3 and by oscillator A1 being restored to its inactive condition by opening switch S1. Each of the other mines may be tested in a similar manner.

It is to be understood that although I have assumed for the purpose of illustration definite frequencies and voltages for the different current sources, the invention is not limited thereto, and other frequencies and voltages can be used.

Apparatus here disclosed has the advantages that the circuits are safe to a high degree in that no failure of any part of a circuit can cause the firing of a mine. The circuit elements are of a construction that a high degree of reliability is achieved and sufficient frequency margin can be provided for selective control and indication of a relatively large group of mines within reasonable frequency bands.

Although I have herein shown and described but one form of selective control and indication systems embodying my invention, it is understood that various changes and modifications may be made therein within the scope of the appended claims without departing from the spirit and scope of my invention.

Having thus described my invention, what I claim is:

1. In combination, a line circuit extending between an office and a remote point, office supply means including a power and a control source of alternating current of a first and a second frequency respectively, said power source connected across said line circuit to supply current thereto, means including a controller to at times connect said control source of current across said circuit to supply current thereto simultaneously with said power current, a transformer and a filter at said remote point connected in multiple across said line circuit, a relay, a gas filled tube having an anode circuit connected to a secondary winding of said transformer through a winding of said relay but normally ineffective to break down the tube, means including said filter to connect a control electrode of said tube to said line circuit and said filter tuned to pass current only of said second frequency to break down said tube when said control source is connected to said line circuit, a condenser, means including an operated contact of said relay and a rectifier to connect said condenser to a secondary winding of said transformer to store energy in the condenser, and an operating unit effectively connected at times to the condenser to operate the unit by such stored energy.

2. In combination, a line circuit, supply means including a source of control alternating current of a first frequency and a source of operating current of a second frequency and both connected at times across said line circuit to supply said two currents simultaneously, a first filter tuned to pass current only of said first frequency, a second filter tuned to pass current only of said second frequency, a relay, another source of current, a gas filled tube having an anode circuit including a winding of said relay and said other current source but ineffective to break down the tube, circuit means including said first filter to connect a control electrode of said tube to said line circuit to break down the tube and energize said relay in response to said control current, a first condenser connected to said other source through an operated contact of said relay to store energy in said first condenser, another gas filled tube having an anode circuit including a second condenser and said other source but ineffective to break down that tube, other circuit means including said second filter to connect a control electrode of said second tube to said line circuit to break down said other tube in response to said operating current to store energy in said second condenser, and an operating means connected at times to said condensers and operated by the energy thus stored therein.

3. In combination, a line circuit extending from an office to a remote point; office supply means including a first, a second and a third source of alternating current of a first, a second and a third frequency respectively; said first source connected to said line circuit, means including controllers to at times connect said second and third sources to said line circuit simultaneously, a transformer and a first and a second filter connected to said line circuit at said remote point, said first and second filters tuned to pass only currents of said second and third frequencies respectively, a relay, a first gas filled tube having an anode circuit connected to a secondary winding of said transformer through a winding of said relay but normally ineffective to break down that tube, means including said first filter to connect a control electrode of said first tube to said line circuit to break down that tube and energize said relay in response to said second current, a second gas filled tube having an anode circuit connected to a secondary winding of said transformer but normally ineffective to break down that tube, means including said second filter to connect a control electrode of said second tube to said line circuit to break down that tube in response to said third current, and operating means receiving energy from said transformer through a contact of said relay and said second tube when it is thus made conductive.

4. In combination, a line circuit extending from an office to a remote point; office supply means including a first, a second and a third source of alternating current of a first, a second and a third frequency respectively, and which sources are at times connected to said line circuit simultaneously, a transformer and a first and a second filter at said remote point and connected to said line circuit, said first and second filters tuned to pass only currents of said second and third frequencies respectively, a relay, a first gas filled tube having an anode circuit connected to a secondary winding of said transformer through a winding of said relay but normally ineffective to break down that tube, means including said first filter to connect a control electrode of said first tube to said line circuit to break down that tube and energize said relay in response to said second current, a second gas filled tube having an anode circuit connected to a secondary winding of said transformer but normally ineffective to break down that tube, means including said second filter to connect a control electrode of said second tube to said line circuit to break down that tube in response to said third current, a first condenser connected to a secondary winding of said transformer through a contact of said relay and a rectifier to charge that condenser, a second condenser interposed in the anode circuit of said second tube to charge that condenser, a third gas filled tube having an anode circuit connected across said condensers in series through an operating unit, and a control electrode of said third tube connected to said transformer through said second tube to break down said third tube and operate said operating unit by the charge thus created on said first and second condensers.

5. In combination, a line circuit extending from an office to a remote point, supply means including a source of direct current connected to said circuit at said office, an oscillator at said remote point connected across said line circuit, said oscillator powered in part at least by said direct current to supply to the circuit at times an alternating current of a preselected frequency and preselected characteristics, an office indication receiver connected to said line circuit through a filter tuned to pass current only of said preselected frequency, said receiver having an output circuit including an indication relay which is effectively energized in response to said characteristics of the indication current, a first and a second office oscillator to supply currents of a first and a second frequency respectively but both normally deenergized, another relay controlled by said indication relay, circuit means including front contacts of said other relay to energize said first and second oscillators and to connect the outputs of these oscillators across said line circuit, a control and an operating means at said remote point, said control means connected to said line circuit through a filter tuned to pass only current of said first frequency, said operating means connected to said line circuit through a filter tuned to pass only current of said second frequency, and an operating unit governed jointly by said control and operating means and effectively energized only when the control and operating means receive current simultaneously.

6. In combination, a line circuit extending from an office to a remote point, a plurality of devices at said remote point and each provided with an indication oscillator connected to said circuit and normally active to supply an indication current of a frequency preselected to be individual for the respective device, detectors one for each said oscillator and each said detector connected to its oscillator to impress at times a predetermined modulation on the respective indication current, indication receivers at said office one for each said device and each receiver connected to said line circuit through a filter tuned to pass only current of the frequency of the oscillator of the respective device, indication relays one for each said receiver and each such relay connected to its receiver to be energized in response to said modulation of the respective indication current, a stick circuit for each of said relays, a repeater relay having a winding common to said stick circuits, an office operating oscillator to supply current of a preselected frequency, office control oscillators one for each said device and each control oscillator to supply current of a frequency made individual for the respective device, office circuit means controlled by said repeater relay and each said indication relay to connect said operating oscillator and the control oscillator for the same device as the indication relay to said line circuit, and control and operating means at each of said devices connected to said line circuit and effectively energized only when currents of said operating frequency and the respective control frequency are supplied to the line circuit simultaneously.

7. In combination, a line circuit extending from an office to a remote point, a plurality of devices at said remote point and each provided with an indication oscillator connected to said circuit and normally active to supply an indication current of a frequency preselected to be individual for the respective device, detectors one for each said oscillator and each said detector connected to its oscillator to impress at times a predetermined modulation on the respective indication current, indication receivers at said office one for each said device and each receiver connected to said line circuit through a filter tuned to pass only current of the frequency of the oscillator of the respective device, indication relays one for each said receiver and each such relay connected to its receiver to be energized in response to said modulation of the respective indication current, a stick circuit for each of said relays, a repeater relay having a winding common to said stick circuits, office control oscillators one for each said devices and each control oscillator to supply control current of a frequency made individual for the respective device, office circuit means controlled by said repeater relay and each of said indication relays when energized to connect the control oscillator for the same device as the indication relay to said line circuit to govern that device, and a contact controlled by said repeater relay when energized to open the connections of the indication relays to the receiver to avoid indication of any device during the control of a device that had previously been indicated.

ALFRED B. MILLER.